Dec. 2, 1930.        F. G. HUGHES        1,783,791
METHOD OF ASSEMBLING ANTIFRICTION BEARINGS
Filed Nov. 8, 1928
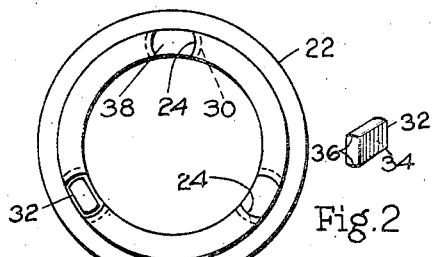
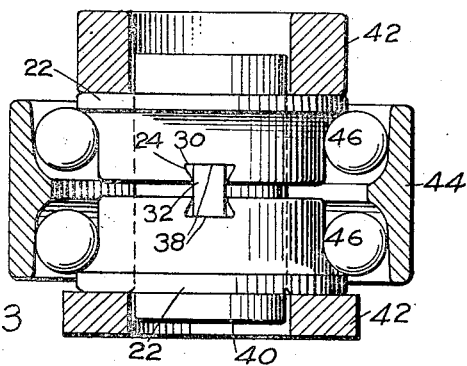
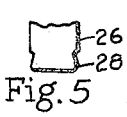
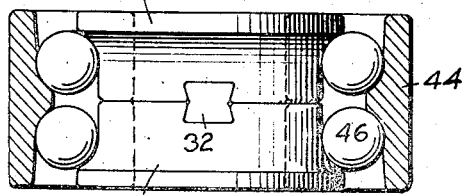
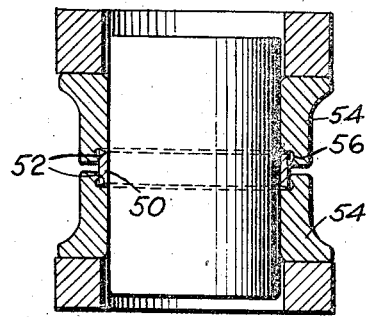
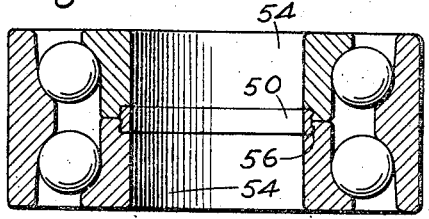
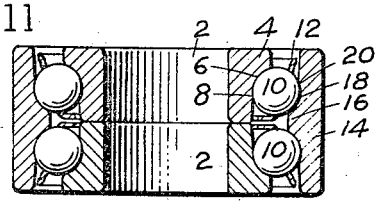
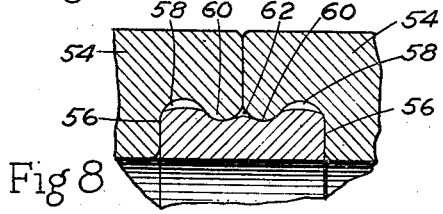
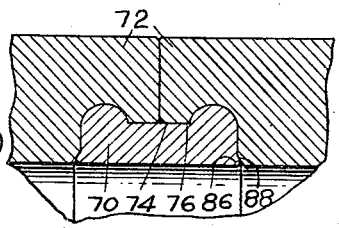
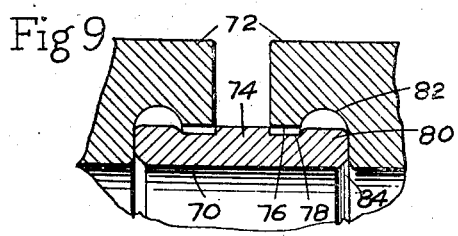
INVENTOR:
FREDERICK G. HUGHES,
BY
HIS ATTORNEY.

Patented Dec. 2, 1930

1,783,791

UNITED STATES PATENT OFFICE

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

METHOD OF ASSEMBLING ANTIFRICTION BEARINGS

Application filed November 8, 1928. Serial No. 318,038.

This invention relates to methods of assembling antifriction bearings and comprises all the features and aspects of novelty herein disclosed. An object of the invention is to provide an improved method of uniting race rings such as the abutting cones or cups of a double row bearing. To improve generally and in detail upon devices and methods of this character, the invention further consists in the various matters hereinafter described and claimed.

In the broader aspects, the invention is not necessarily limited to the specific constructions and steps selected for illustration in the accompanying drawings in which Fig. 1 is an end view of a bearing cone provided at one end with undercut slots.

Fig. 2 is a perspective view of a fastener.

Fig. 3 is a side view, partly in section, of two cones ready for fastening.

Fig. 4 is a similar view of the two cones fastened together.

Fig. 5 is an outline view of a cutter.

Fig. 6 is a sectional view of two cones ready for uniting by a different fastener.

Fig. 7 is a sectional view of the cones fastened together.

Fig. 8 is an enlarged section of a portion of the race rings and the fastener.

Fig. 9 is an enlarged section of two cones and a fastening ring before upsetting.

Fig. 10 is an enlarged section of the cones of Fig. 9 fastened together and

Fig. 11 is an axial section of a double row bearing composed of abutting cones which are not intended to be fastened together.

Referring first to Fig. 11, numeral 2 indicates abutted inner race rings or cones with end shoulders 4 having angular contact raceways 6 and snap ribs 8 over which the rows of balls 10 are snapped after insertion in the openings of their separators 12. The outer race ring 14 is in one piece and comprises a central rib 16 having a raceway 18 at each side and there are snap ribs at 20 over which the balls are snapped. The snap ribs hold the race rings together during shipment and handling. Such a bearing is very satisfactory when the cones both fit snugly on a supporting shaft and stay there during the operation of the bearing but occasionally, through no fault of the bearing, a shaft will not fit both cones alike and if one cone turns or cocks a little, the bearing will develop looseness and wear. It has been proposed to fasten such cones together but the forces tending to loosen them are so powerful that prior fastening devices have not been satisfactory. Sometimes the inner and the outer race rings of a double row bearing are each made in one piece but such bearings require filling slots for the balls or are otherwise not easily assembled.

Referring to Figs. 1 to 5, each inner race ring or cone 22 is accordingly provided with a plurality of mating undercut slots or grooves 24 conveniently made by feeding an end milling cutter 26 endwise to the small end of the cone and thereafter feeding the cutter circumferentially of the cone in both directions a little way so that the enlarged portion 28 of the cutter will produce the undercuts 30 in the cones. The cutter is preferably of such size that the grooves or slots break through both peripheries of the cones and the sides of the grooves are arcuate. A plurality of deformable fasteners such as slugs 32 are formed, each slug having flattened sides 34 and arcuate edges 36. Each slug has one oversize dimension initially, being longer than the space between the bottoms 38 of the mating grooves when the cones abut and its dimensions being so selected that it will completely fill the mating grooves when upset by the pressing together of the cones. Upsetting is conveniently done by fitting the cones on a cylindrical arbor or mandrel 40, placing the slugs in the mating grooves, and then pressing the cones into abutting relation by means of collars 42, at least one collar being movable and a one-piece outer race ring 44 and balls 46 being previously assembled around the cones. The slugs are thereby upset and lock the cones against relative turning or axial separation. The arcuate nature of the grooves provides means for preventing displacement of the slugs radially of the bearing. The bearing is permanently assembled and it is not necessary to utilize snap ribs.

According to Figs. 6, 7 and 8, the deformable fastening may be in the form of a continuous ring 50, preferably bevelled at its sides 52 to help prevent the ring, when being upset, from flowing between the cones. The ends of cones 54 are provided with annular grooves 56, each preferably at the inner periphery and having reversely curved walls presenting a concavity 58 and a convexity 60. The ends of the upset ring flow into the concavities 58 to lock the cones against axial separation and the meeting convexities 60 form a space 62 where flow of the metal will not separate the abutting edges of the cones.

Fig. 9 shows a deformable fastening ring 70 specially formed to give it a predisposition to fill mating grooves in the cones 72. The ring has a central rib 74 of a diameter to be received within a wall 76 of each cone and also has reduced walls 78 which favor upsetting of the ring and the flow of the enlarged ends 80 to fill the concavities 82 of the grooves. The ring has chamfers 84 at its ends but upsetting produces coned projections 86 fitting chamfers 88 at the bores of the cones as indicated in Fig. 10.

The above described methods of assembling bearings may be applied to bearings having a one-piece inner race ring and a two-piece outer race ring in which case the two abutting pieces would preferably be surrounded by a cylindrical surface to center them and confine the fastener.

I claim:

1. The method of uniting abutted race rings of a double row bearing, which consists in cutting mating grooves in the adjacent ends of the rings at one periphery thereof, utilizing a cylindrical surface at said periphery to confine a deformable fastener in the mating grooves when the rings are separated axially, and then pressing the rings into abutting relation to upset the fastener and cause it to flow into the grooves; substantially as described.

2. The method of uniting abutted race rings of a double row bearing which consists in making undercut grooves in the adjacent ends of the rings at the inner periphery thereof, fitting a cylindrical mandrel in the bore of the race rings to confine a deformable fastener in the grooves when the rings are separated axially, and then pressing the rings into abutting relation to upset the fastener and cause it to flow into the grooves; substantially as described.

3. The method of uniting abutted race rings of a double row bearing, which consists in cutting mating grooves in the adjacent ends of the rings, fitting a mandrel in the bore of the race rings, inserting a deformable fastener in the mating grooves while the rings are separated axially on the mandrel, and then forcing one of the race rings along the mandrel into abutting relation to the other race ring to upset the fastener and cause it to flow into the grooves; substantially as described.

4. The method of assembling a double row bearing having a one-piece race ring with a central rib and a two-piece race ring with end shoulders, which consists in cutting mating grooves in the adjacent ends of the two-piece ring, inserting rolling elements in the raceways of the one-piece ring, inserting a deformable fastener in the mating grooves of the two-piece ring while said rings are separated axially near the ends of the one piece ring, and then pressing the rings into abutting relation to upset the fastener and cause it to flow into the grooves; substantially as described.

5. The method of uniting abutting race rings of an antifriction bearing, which consists in making annular grooves in the adjacent ends of the rings at one periphery thereof, inserting a deformable ring in the annular grooves while the rings are separated axially, utilizing a cylindrical surface to hold the race rings and the deformable ring in axial alignment, and pressing the race rings into abutting relation to upset the deformable ring and cause it to flow into the grooves; substantially as described.

6. The method of uniting abutting race rings of an antifriction bearing, which consists in making undercut annular grooves in the adjacent ends of the rings at one periphery thereof, inserting a deformable ring in the grooves while the rings are separated axially, utilizing a cylindrical surface to confine the deformable ring in the grooves of the race rings, and forcing one of the race rings axially along the cylindrical surface into abutting relation to the other race ring to upset the deformable ring and cause it to flow into the undercut grooves; substantially as described.

In testimony whereof I hereunto affix my signature.

FREDERICK G. HUGHES.